United States Patent
Chapman et al.

(10) Patent No.: US 11,242,790 B2
(45) Date of Patent: Feb. 8, 2022

(54) FLOW REVERSING MIXER ASSEMBLY

(71) Applicant: Faurecia Emissions Control Technologies, Columbus, IN (US)

(72) Inventors: Chris Chapman, Columbus, IN (US); Philip M. Dimpelfeld, Columbus, IN (US); Syed Saleem Quadri, Columbus, IN (US); Aejaz Ahmed, Bangalore (IN)

(73) Assignee: Faurecia Emissions Control Technologies, Columbus, IN (US)

( * ) Notice: Subject to any disclaimer, the term of this patent is extended or adjusted under 35 U.S.C. 154(b) by 0 days.

(21) Appl. No.: 16/756,280

(22) PCT Filed: Nov. 3, 2017

(86) PCT No.: PCT/US2017/059874
§ 371 (c)(1),
(2) Date: Apr. 15, 2020

(87) PCT Pub. No.: WO2019/089041
PCT Pub. Date: May 9, 2019

(65) Prior Publication Data
US 2020/0332696 A1 Oct. 22, 2020

(51) Int. Cl.
*F01N 3/28* (2006.01)
*B01D 53/94* (2006.01)
(Continued)

(52) U.S. Cl.
CPC ....... *F01N 3/2892* (2013.01); *B01D 53/9431* (2013.01); *B01F 3/04049* (2013.01);
(Continued)

(58) Field of Classification Search
CPC . F01N 3/2892; F01N 3/2066; B01D 53/9431; B01F 5/0164
(Continued)

(56) References Cited

U.S. PATENT DOCUMENTS

| | | | | |
|---|---|---|---|---|
| 6,722,124 B2 * | 4/2004 | Pawson | ............... | F01N 13/0097 60/286 |
| 8,695,330 B2 * | 4/2014 | Davidson | ........... | B01D 53/9495 60/303 |

(Continued)

FOREIGN PATENT DOCUMENTS

| | | |
|---|---|---|
| CN | 103140655 A | 6/2013 |
| CN | 103168155 A | 6/2013 |

(Continued)

OTHER PUBLICATIONS

Chinese Official Action dated May 8, 2021 for CN Application No. 201780096538.9.
(Continued)

*Primary Examiner* — Tom P Duong
(74) *Attorney, Agent, or Firm* — Carlson, Gaskey & Olds, P.C.

(57) ABSTRACT

A mixer assembly for a vehicle exhaust system includes a housing having an inlet portion and an outlet portion that are connected to each other with a channel portion. An inlet baffle is positioned at the inlet portion and an outlet baffle is positioned at the outlet portion. The inlet and outlet baffles are non-concentric. An injector housing is attached to the housing downstream of the inlet baffle and a spray guide is mounted within the injector housing. The spray guide has a spray inlet and a spray outlet that directs spray into the channel portion.

28 Claims, 4 Drawing Sheets

(51) Int. Cl.
  *B01F 3/04* (2006.01)
  *B01F 5/04* (2006.01)
  *B01F 5/06* (2006.01)
  *F01N 3/20* (2006.01)
  *B01F 5/00* (2006.01)

(52) U.S. Cl.
  CPC .......... *B01F 5/0473* (2013.01); *B01F 5/0605* (2013.01); *B01F 5/0614* (2013.01); *B01F 5/0618* (2013.01); *F01N 3/2066* (2013.01); *B01F 2005/0022* (2013.01); *B01F 2005/0091* (2013.01); *F01N 2610/02* (2013.01); *F01N 2610/1453* (2013.01)

(58) Field of Classification Search
  USPC .................................................. 422/172, 176
  See application file for complete search history.

(56) References Cited

U.S. PATENT DOCUMENTS

| | | | |
|---|---|---|---|
| 2014/0230418 A1 | 8/2014 | Perrot et al. | |
| 2016/0115847 A1* | 4/2016 | Chapman | B01F 5/0473 60/324 |
| 2016/0138454 A1* | 5/2016 | Alano | B01F 5/0614 422/168 |
| 2016/0319724 A1 | 11/2016 | Alano et al. | |
| 2016/0326931 A1* | 11/2016 | Freeman | F01N 13/0097 |
| 2017/0022870 A1* | 1/2017 | Chapman | F01N 3/28 |
| 2017/0167344 A1 | 6/2017 | Alano et al. | |
| 2017/0175606 A1 | 6/2017 | Peace | |
| 2017/0191395 A1 | 7/2017 | Alano et al. | |

FOREIGN PATENT DOCUMENTS

| | | |
|---|---|---|
| CN | 106414931 A | 2/2017 |
| CN | 206144633 U | 5/2017 |
| DE | 102010014037 A1 | 11/2010 |
| DE | 102015115220 A1 | 4/2016 |
| WO | 2013004769 A1 | 1/2013 |
| WO | 2016169709 A1 | 10/2016 |
| WO | 2016176078 A1 | 11/2016 |

OTHER PUBLICATIONS

European Search Report dated Feb. 12, 2021 for European Patent Application No. 17930825.9.

* cited by examiner

FLOW REVERSING MIXER ASSEMBLY

BACKGROUND OF THE INVENTION

An exhaust system conducts hot exhaust gases generated by an engine through various exhaust components to reduce emissions and control noise. The exhaust system may include a diesel particulate filter (DPF) that is configured to remove particulate contaminates from exhaust gas flow prior to the exhaust gases entering downstream exhaust system components. The system may also include a diesel oxidation catalyst (DOC) upstream of the DPF which converts exhaust gas pollutants, such as carbon monoxide for example, into substances such as carbon dioxide and water. In one known configuration, the exhaust system includes an injection system with a doser that injects a reducing agent, such as urea for example, into the exhaust gases downstream of the DPF/DOC and upstream of a selective catalytic reduction (SCR) catalyst. A mixer is positioned downstream of the DPF/DOC and upstream of the SCR catalyst. The doser is mounted to an outer peripheral surface of the mixer which is configured to mix engine exhaust gases with urea injected by the doser prior to the exhaust stream entering the SCR catalyst.

In one known configuration, the various components are in an inline series configuration. However, certain tight packaging constraints can lead to splitting up the inline configuration into two separate modules that are parallel to each other. This type of configuration then requires a flow reversing device. The addition of such a device further complicates packaging and increases cost.

SUMMARY OF THE INVENTION

According to one exemplary embodiment, a mixer assembly for a vehicle exhaust system includes a housing having an inlet portion and an outlet portion that are connected to each other with a channel portion. An inlet baffle is positioned at the inlet portion and an outlet baffle is positioned at the outlet portion. The inlet and outlet baffles are non-concentric. An injector housing is attached to the housing downstream of the inlet baffle and a spray guide is mounted within the injector housing. The spray guide has a spray inlet and a spray outlet that directs spray into the channel portion.

In another exemplary embodiment, a vehicle exhaust system assembly includes a first exhaust component assembly extending along a first axis, a second exhaust component assembly extending along a second axis that is spaced apart and parallel to the first axis, and a mixer that connects a component outlet from the first exhaust component assembly to a component inlet of the second exhaust component assembly. The mixer includes a mixer housing having an inlet portion and an outlet portion that are connected to each other with a channel portion. The mixer also includes an inlet baffle positioned at the inlet portion and an outlet baffle positioned at the outlet portion, where the inlet baffle is concentric with the first axis and the outlet baffle is concentric with the second axis. An injector assembly includes an injector housing that is attached to the mixer housing downstream of the inlet baffle and a cone that is mounted within the injector housing. The cone has a cone inlet that receives spray from an injector and has a cone outlet that directs spray into the channel portion.

These and other features of the present invention can be best understood from the following specification and drawings, the following of which is a brief description.

DETAILED DESCRIPTION

Figure 1:
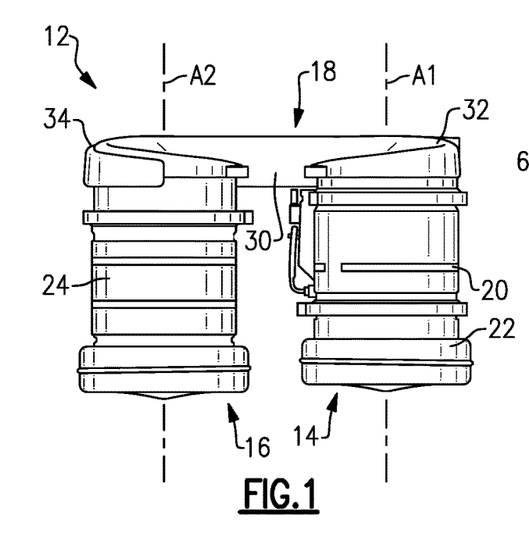
FIG. 1 shows one example of a vehicle exhaust system with a mixer.

FIG. 1 shows one example of a vehicle exhaust system 12 that conducts high temperature exhaust gases generated by an engine (not shown) through various exhaust components to reduce emissions and control noise as known. In the example shown in FIG. 1, a first exhaust component assembly 14 extends along a first axis A1 and a second exhaust component assembly 16 extends along a second axis A2 that is spaced apart and parallel to the first axis A1. A mixer 18 connects a component outlet from the first exhaust component assembly 14 to a component inlet of the second exhaust component assembly 16. Further, due to the parallel configuration of the exhaust component assemblies 14, 16, the mixer 18 also serves as a flow reversing device.

In one example configuration, the first exhaust component assembly 14 includes a diesel particulate filter (DPF) 20 and a diesel oxidation catalyst (DOC) 22 that is upstream of the DPF 20. The DPF 20 is configured to remove particulate contaminates from exhaust gas flow prior to the exhaust gases entering downstream exhaust system components. The DOC 22 converts exhaust gas pollutants, such as carbon monoxide for example, into substances such as carbon dioxide and water. In this example, the second exhaust component assembly 16 includes a selective catalytic reduction (SCR) catalyst 24. As known, SCR technology allows nitrogen oxide (NOx) reduction reactions to take place in an oxidizing atmosphere. The levels of NOx are reduced using a reducing agent, such as urea for example. The reducing agent reacts with NOx to convert the pollutants into nitrogen, water, and small amounts of carbon dioxide ($CO_2$).

In one example configuration, the exhaust system 10 includes an injection system 26 (FIG. 4) with an injector or doser 28 that injects a reducing agent, such as a solution of urea and water for example, into the exhaust gases downstream of the DPF 20 and upstream the SCR catalyst 24. The mixer 18 is positioned upstream of the SCR catalyst 24 and mixes engine exhaust gases with the injected reducing agent. The doser 28 is mounted to an outer peripheral surface of the mixer 18.

Figure 2:
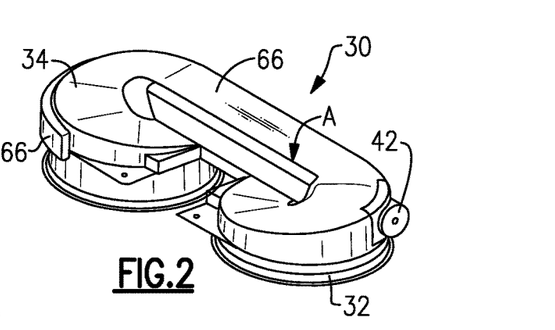
FIG. 2 shows a perspective view of the mixer of FIG. 1.

In one exemplary embodiment, the mixer 18 has a mixer housing 30 that includes an inlet portion 32 and an outlet portion 34 that are connected to each other with a channel portion 36 as shown in FIG. 2. In one example, the channel portion 36 is offset relative to a center of the mixer housing 30 and extends generally along a peripheral edge of the housing 30. An inlet baffle 38 is positioned at the inlet portion 32 and an outlet baffle 40 is positioned at the outlet portion 34. Due to the parallel exhaust component configuration, the inlet 38 and outlet 40 baffles are non-concentric. The inlet baffle 38 is concentric with the first axis A1 and the outlet baffle 40 is concentric with the second axis A2. An injector housing 42 is attached to the mixer housing 30 downstream of the inlet baffle 38. The doser 28 is externally mounted to the injector housing 42 and injects the reducing agent into a spray guide 44 that is mounted within the injector housing 42. The spray guide 44 has a spray inlet that receives injected fluid from the doser 28 and has a spray outlet that directs fluid spray into the channel portion 36.

In one example, the inlet 32 and outlet 34 portions have mirrored helix shapes that are connected by the channel portion 36. In one example, the channel portion 36 comprises a rectangular sectioned straight duct. The inlet portion 32 receives exhaust gas from an outlet of the DPF 20 through the inlet baffle 38. In one example shown in FIG. 3, the inlet baffle 38 comprises a flat perforated baffle plate. The inlet baffle 38 includes various types of openings, slots, apertures, etc. and is configured to direct certain percentages of exhaust gas to different areas of the mixer 18. In one example, the inlet baffle 38 includes at least one primary opening 46, at least one secondary opening 48 smaller than the primary opening 46, and a plurality of third openings 50 that are smaller than the secondary opening 48.

Figure 3:
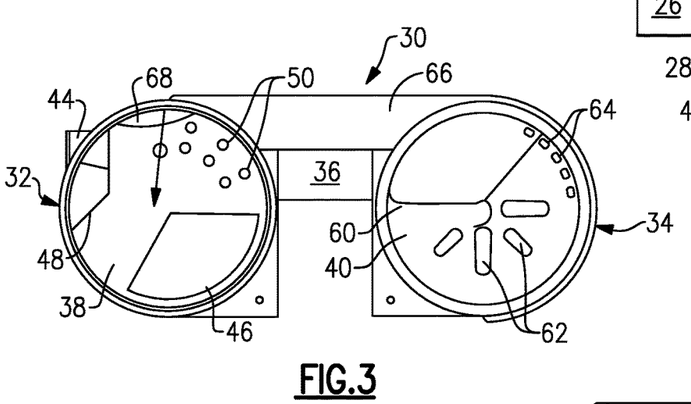
FIG. 3 is an end view showing one example of inlet and outlet baffles for the mixer of FIG. 2.

A majority of the exhaust gas flows through the primary opening 46 which is an open area adjacent to a lowest part of the mixer housing upstream helix. The secondary opening 48 directs flow into the injector housing 42 which diverts the exhaust gas into the spray guide 44 which shrouds the spray stream and pushes the spray into the channel portion 36 and then into the outlet portion 34 of the mixer housing 30. The plurality of third openings 50 comprise a series of perforated slots or holes in the inlet baffle 38 which allow exhaust gas from the DPF 20 to enter the spray area and promote droplet breakup. The exhaust and spray mixture flows through the channel portion 36 until the mixture meets the downstream helix shape in the mixer housing 30 where the mixture is forced to flow around the helix and exit through the outlet baffle 40 just before an inlet to a face of the SCR 24. In one example, the outlet baffle 40 comprises a helical baffle plate that further promotes an evenly distributed mixture. In one example, there is a gap between the outlet baffle 40 and the SCR face of at least 25 mm that allows the mixture of gas and fluid to evenly distribute over the SCR surface.

In one example, the location and size of the primary opening 46 is configured to control and direct 30-80% of the exhaust gas exiting the DPF 20 into a volume inside the mixer housing 30 that is upstream of the spray outlet. The plurality of third openings 50 in the inlet baffle 38 are located adjacent to the spray outlet to allow 10-20% of the exhaust gas exiting the DPF 20 to initiate breaking up the spray into ammonia gas. The secondary opening 48 comprises a slot that is used to feed 5-20% of the exhaust gas to the spray guide 44. The slot is located at a periphery of the inlet baffle 38 and is adjacent to a spray guide cavity defined within the injector housing 42.

As discussed above, the mixer housing 30 includes an upstream helix that features a helix shaped upper surface of the inlet portion 32. In one example, the pitch of the helix is exactly the height of the mixer housing 30 so that the lowest part of the helix forms a tight gap between the lower part and an inlet baffle surface, so that exhaust gas cannot bypass from the main opening directly to the outlet baffle 40. The helix helps guide the exhaust gas exiting the primary opening 46 in the inlet baffle 38 past the injection spray zone.

In one example, the spray guide 44 comprises a cone 52 (FIG. 4) that is mounted within the injector housing 42 and which extends from a cone inlet 54 to a cone outlet 56. The cone inlet 54 is defined by a first cross-sectional area that is less than a second cross-sectional area at the cone outlet 56. The injector housing 42 extends outside the mixer housing 30 and comprises a cylindrical shape such that the housing 42 surrounds the cone 52 concentrically. The injector housing 42 guides the exhaust gas from the secondary opening 48 in the inlet baffle 38 along an outer surface of the cone 52 up to an inside surface of the housing 42 at the doser mount location. The flow then enters the cone inlet 54 which is at the smaller diameter and open end of the cone 52.

Figure 4:
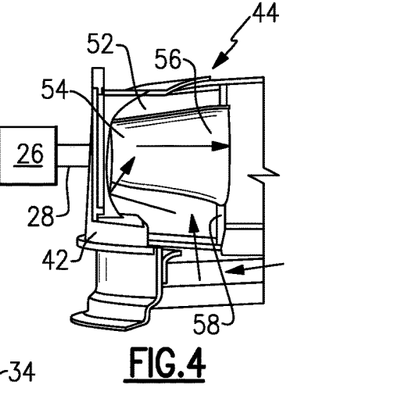
FIG. 4 is a side section view of one example injection assembly used with the mixer of FIG. 2.
Figure 5A:
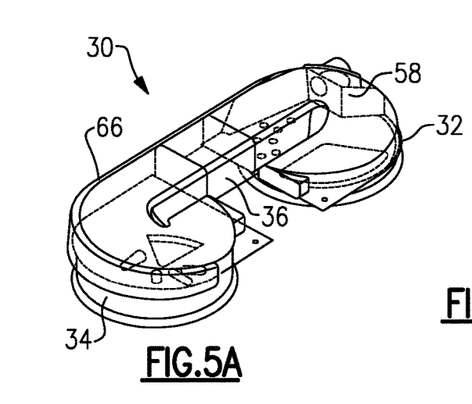
FIG. 5A is perspective view of the mixer and an outer jacket from the mixer of FIG. 2.
Figure 5B:
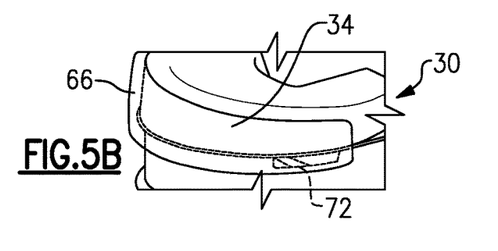
FIG. 5B shows a jacket outlet for the jacket of FIG. 5A.
Figure 5C:
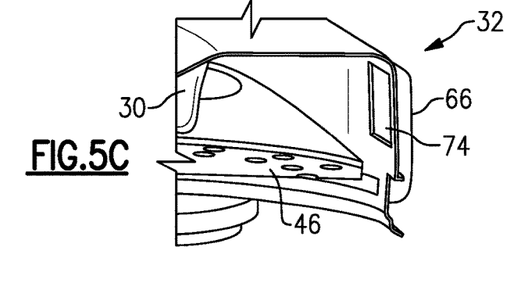
FIG. 5C shows a jacket inlet for the jacket of FIG. 5A.
Figure 6:
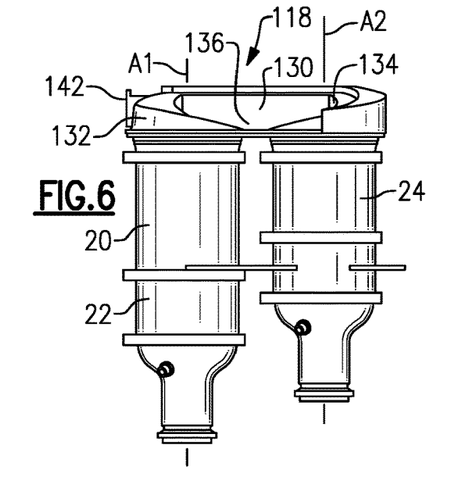
FIG. 6 shows another example of a vehicle exhaust system with a mixer.

A swirl cone deflector plate 58 is attached to the large diameter open end of the cone 52 near the cone outlet 56 to support the cone 52 in the mixer 18. The deflector plate 58 also divides a main mixer volume (receiving exhaust gas from the primary opening 46 and third openings 50) from a cone volume (receiving exhaust gas from the secondary opening 48) within the injector housing 42 to duct the 5-20% of exhaust flow into the cone inlet 54.

In one example, the channel portion 36 comprises a duct that is a straight section of the mixer housing 30 and which is co-axial with the injection spray. In one example, the duct cross-section is rectangular and has a cross-sectional area that is the same as an inlet pipe to the aftertreatment exhaust system. In one example, the width of the duct is half the width of the mixer 18, and the height is determined based on the packaging of the cone 52; however, the height is adjusted to be as minimal as possible for packaging purposes, while also providing the correct cross sectional area.

As discussed above, the outlet portion 34 of the mixer housing 30 comprises a downstream helix that is a mirror of the upstream helix of the inlet portion 32. The helix surface guides the exhaust gas from the channel portion 36 to distribute over the outlet baffle 40 and then exit through a primary opening 60 of the outlet baffle 40. The lowest part of the helix touches the outlet baffle 40 to create a guiding wall for the exhaust gas and to prevent the exhaust gas from flowing directly through the primary opening 60 and bypassing the mixing effect in the downstream helix section.

In one example, the outlet baffle 40 comprises a helix shape that is exactly the same pitch and direction of rotation as the shape of the downstream helix of the mixer housing 30. In one example, the outlet baffle 40 includes at least one primary opening 60 and a plurality of slots or secondary openings 62 that extend in a radial direction relative to a center of the outlet baffle 40. The outlet baffle 40 may also include additional openings 64 as needed to further facilitate exhaust gas flow. In one example, the primary opening 60 is sized to receive between 60-80% of the exhaust flow and the secondary openings comprise two to four radially oriented slots that are circumferentially spaced evenly apart prior to the primary opening 60. The slots allow the remainder of the exhaust flow to exit the outlet baffle 40 to the SCR 24. This configuration helps distribute the exhaust gas and ammonia gas over the SCR more efficiently.

In one example, the mixer 18 includes an outer jacket 66 that extends at least partially around a portion of the channel portion 36. As shown in FIGS. 2 and 5A-C in one exemplary embodiment, the jacket 66 extends from a location near the inlet baffle 38, along the channel portion 36, and extends around a substantial portion of the outlet portion 34 of the housing 30. The exhaust gas flow enters the jacket 66 via at least one opening or slot 68 (FIG. 3) formed in the outer edge of the inlet baffle 38 and a slot 74 in the housing 30. The slot 68, in one example, is positioned circumferentially between the secondary opening 48 and the third openings 50. Exhaust gas flow exits the jacket 66 through a slot 72 that is just upstream of the outlet baffle 40.

Figure 7:
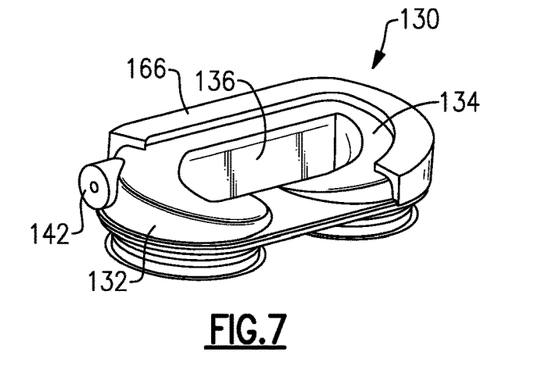
FIG. 7 shows a perspective view of the mixer of FIG. 6.

FIGS. 6 through 10C show another exemplary embodiment of a mixer 118. The mixer 118 has a mixer housing 130 that includes an inlet portion 132 and an outlet portion 134 that are connected to each other with a channel portion 136 as shown in FIG. 7. In one example, the channel portion 136 is offset relative to a center of the mixer housing 130 and extends generally along a peripheral edge of the housing 130. An inlet baffle 138 is positioned at the inlet portion 132 and an outlet baffle 140 is positioned at the outlet portion 134, with the inlet 138 and outlet 140 baffles being non-concentric. The inlet baffle 138 is concentric with the first axis A1 and the outlet baffle 140 is concentric with the second axis A2. An injector housing 142 is attached to the mixer housing 130 downstream of the inlet baffle 138. The doser 28 is externally mounted to the injector housing 142 and injects the reducing agent into a spray guide 144 that is mounted within the injector housing 142. The spray guide 144 has a spray inlet that receives injected spray from the doser 28 and has a spray outlet that directs fluid spray into the channel portion 136.

In one example, the inlet 132 and outlet 134 portions have mirrored helix shapes that are connected by the channel portion 136. In one example, the channel portion 136 comprises a rectangular sectioned straight duct. The inlet portion 132 receives exhaust gas from an outlet of the DPF 20 through the inlet baffle 138. In one example shown in FIG. 8, the inlet baffle 138 comprises a flat perforated baffle plate. The inlet baffle 138 includes various types of openings, slots, apertures, etc. and is configured to direct certain percentages of exhaust gas to different areas of the mixer 118. In one example, the inlet baffle 138 includes at least one primary opening 146, at least one secondary opening 148 smaller than the primary opening 146, and a plurality of third openings 150 that are smaller than the secondary opening 148.

The inlet baffle 138 may also include at least one opening or slot 168 (FIG. 8) formed in the outer edge of the inlet baffle 138 that is used to direct exhaust gas into an outer jacket 166. The slot 168 is positioned near the perforated third openings 150 and near the upstream helix, and the slot 168 directs exhaust gas flow to enter a secondary channel in the jacket 166 that is separate from the main channel of the housing 130. The flow is directed along an external surface of the channel portion 136 and enters back into the mixer housing 130 at the opposite end of the mixer 118 at the downstream helix. The exhaust gas in the jacket 166 heats the outer wall of the mixer housing 130 that is subject to spray impingement on the inside to prevent deposits from forming.

Figure 8:
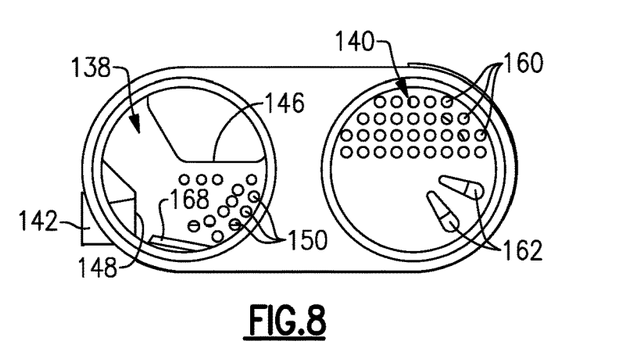
FIG. 8 is an end view showing one example of inlet and outlet baffles for the mixer of FIG. 7.

A majority of the exhaust gas flows through the primary opening 146 which is an open area adjacent to a lowest part of the mixer housing upstream helix. The secondary opening 148 directs flow into the injector housing 142 which diverts the exhaust gas into the spray guide 144 which shrouds the spray stream and pushes the spray into the channel portion 136 and then into the outlet portion 134 of the mixer housing 130. The plurality of third openings 150 comprise a series of perforated slots or holes in the inlet baffle 138 which allow exhaust gas from the DPF 20 to enter the spray area and promote droplet breakup. The exhaust and spray mixture flows through the channel portion 136 until the mixture meets the downstream helix shape in the mixer housing 130 where the mixture is forced to flow around the helix and exit through the outlet baffle 140 just before an inlet to a face of the SCR 24. In one example, there is a gap between the outlet baffle 140 and the SCR face of at least 25 mm that allows the mixture to more evenly distribute over the SCR surface.

In one example, the location and size of the primary opening 146 is configured to control and direct 30-80% of the exhaust gas exiting the DPF 20 into a volume inside the mixer housing 130 that is upstream of the spray outlet. The plurality of third openings 150 in the inlet baffle 138 are located adjacent to the spray outlet to allow 10-20% of the exhaust gas exiting the DPF 20 to initiate breaking up the spray into ammonia gas. The secondary opening 148 feeds 5-20% of the exhaust gas to the spray guide 144. Another slot 168 is located at a periphery of the inlet baffle 138 and is circumferentially between the secondary opening 148 and third openings 150. The slot 168 allows exhaust flow to enter the heated jacket 166 separate from the main flow path and enters back into the upper housing 130 at the opposite end of the mixer 118. The exhaust gas in the jacket 166 heats the outer wall of the upper housing 130 where there is spray impingement on the inside. In one example, the slot 168 in the periphery of the inlet baffle 138 receives between 5-20% of the exhaust flow and ducts the flow into the heated outer jacket 166.

Figure 10A:
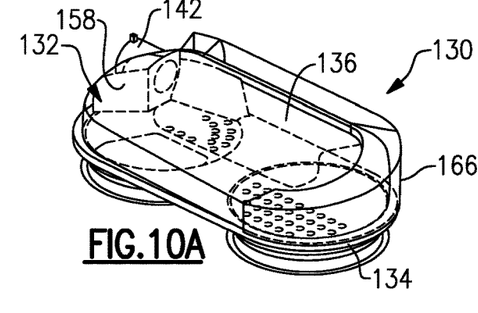
FIG. 10A is perspective view of the mixer and an outer jacket from the mixer of FIG. 7.
Figure 10B:
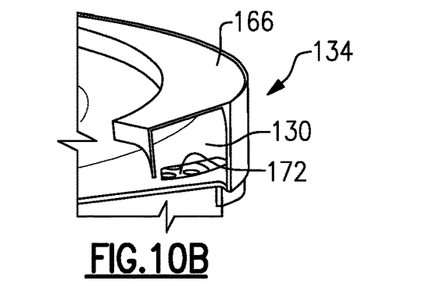
FIG. 10B shows a jacket outlet for the jacket of FIG. 10A.
Figure 10C:
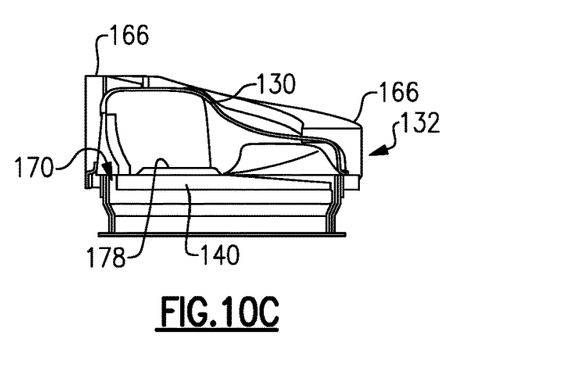
FIG. 10C shows a jacket inlet for the jacket of FIG. 10A.

In one example, the externally mounted jacket 166 has an L-shaped cross-section that envelopes one side and a top of the mixer housing 130 along the channel portion 136 of the mixer housing 130 and follows the same curvature and helix pitch as the outlet portion 134 of the mixer housing 130. In one example, there is a 5-10 mm gap between the jacket 166 and the housing 130 to form a secondary flow channel within the jacket 166. A slot 170 in the mixer housing 130 at the inlet portion 132 receives exhaust gas from the slot 168 in the inlet baffle 138 and a slot 172 in the outlet portion 134 allows the flow to exit from the heated jacket 166 upstream of the outlet baffle 140. As discussed above, the jacket 166 is used to heat an external side of the mixer housing 130 with 5-20% of the exhaust gas.

Figure 11:
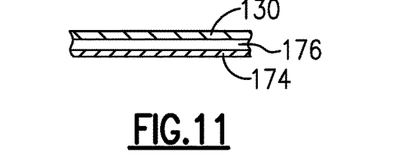
FIG. 11 is a schematic representation of a mixer with an inner wall configuration.
Figure 12:
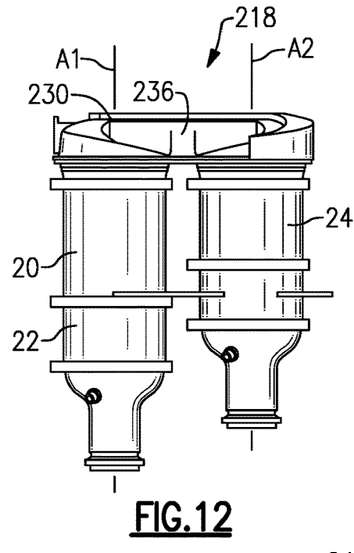
FIG. 12 shows another example of a vehicle exhaust system with a mixer.

As an alternative to the heated jacket 166, an inner wall 174 (FIG. 11) could be used to provide a heated surface inside the mixer housing 130. In one example, a gap 176 between an inner surface of the mixer housing 130 and the inner wall 174 is 5-10 mm. The inner wall 174 extends the full height of the mixer housing 130, extends from the spray guide 144 to the outlet portion 134 of the mixer housing 130, and follows the helix shape to end after rotating 100 degrees into the outlet portion 134 of the mixer housing 130. Approximately, 5-20% of the exhaust gas would be ducted from the slot 168 in the inlet baffle 140 through the gap 176 between the inner wall 174 and the internal surface of the housing 130 before exiting into the outlet portion 134.

As discussed above, the mixer housing 130 includes an upstream helix that features a helix shaped upper surface of the inlet portion 132. In one example, the pitch of the helix is exactly the height of the mixer housing 130 so the lowest part of the helix forms a tight gap between the lower part and an inlet baffle surface, so that exhaust gas cannot bypass from the main opening to the outlet baffle 140. The helix helps guide the exhaust gas exiting the primary opening 146 in the inlet baffle 138 past the injection spray zone.

In one example, the spray guide 144 comprises a cone 152 (FIG. 9) that is mounted within the injector housing 142 and which extends from a cone inlet 154 to a cone outlet 156. The cone inlet 154 is defined by a first cross-sectional area that is less than a second cross-sectional area at the cone outlet 156. The injector housing 142 extends outside the mixer housing 130 and comprises a cylindrical shape such that the housing 142 surrounds the cone 152 concentrically. The injector housing 142 guides the exhaust gas from the secondary opening 148 in the inlet baffle 138 along an outer surface of the cone 152 up to an inside surface of the housing at the doser mount location. The flow then enters the cone inlet 154 which is at the smaller diameter and open end of the cone 152.

Figure 9:
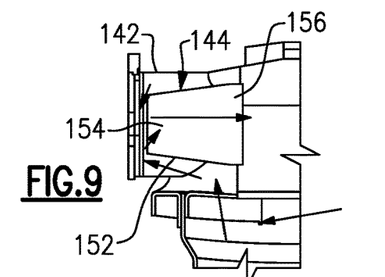
FIG. 9 is a side section view of one example injection assembly used with the mixer of FIG. 7.

A swirl cone deflector plate 158 is attached to the large diameter open end of the cone 152 near the cone outlet to support the cone 152 in the mixer 18. The deflector plate 158 also divides a main mixer volume (receiving exhaust gas from the primary opening 146 and third openings 150) from a cone volume (receiving exhaust gas from the secondary opening 148) within the injector housing 142 to duct the 5-20% of exhaust flow into the cone inlet 154.

In one example, the channel portion 136 comprises a duct that is a straight section of the mixer housing 130 and is co-axial with the injection spray. In one example, the duct cross-section is rectangular and has a cross-sectional area that is the same as an inlet pipe to the after treatment exhaust system. In one example, the width of the duct is half the width of the mixer 18, and the height is determined based the packaging of the cone 152; however, the height is adjusted to be as minimal as possible for packaging purposes, while also providing the correct cross sectional area.

As discussed above, the outlet portion 134 of the mixer housing 130 comprises a downstream helix that is a mirror of the upstream helix of the inlet portion 132. The helix surface guides the exhaust gas from the channel portion 136 to distribute over the outlet baffle 140 and then exit through a primary opening 160 of the outlet baffle 140. The lowest part of the helix touches the outlet baffle 140 to create a guiding wall for the exhaust gas and to prevent the exhaust gas from flowing directly through the primary opening 160 and bypassing the mixing effect in the downstream helix section.

In one example, the outlet baffle 140 includes at least one primary opening 160 and a plurality of secondary openings or slots 162 that extend in a radial direction relative to a center of the outlet baffle 140. In one example, the outlet baffle 140 comprises a flat plate and the at least one primary opening 160 comprises a plurality of openings 160 that form perforated hole pattern over approximately half of the area of the flat outlet baffle 140. In one example, the primary openings 160 are sized to receive between 60-80% of the exhaust flow and the secondary openings comprise two radially oriented slots 162 that are circumferentially spaced evenly apart for each other. The slots 162 allow the remainder of the exhaust flow to exit the outlet baffle 140 to the SCR 24. This configuration helps distribute the exhaust gas and ammonia gas over the SCR more efficiently.

In one example, the slots 162 have protrusions 178 around their periphery which extend upward 2-5 mm in the opposite direction to the flow which retain urea inside the outlet portion 134 of the mixer housing 130. This promotes improved urea break up to ammonia and prevents the liquid from running through the slots 162 towards the SCR 24 which could lead to deposit formation.

Figure 13:
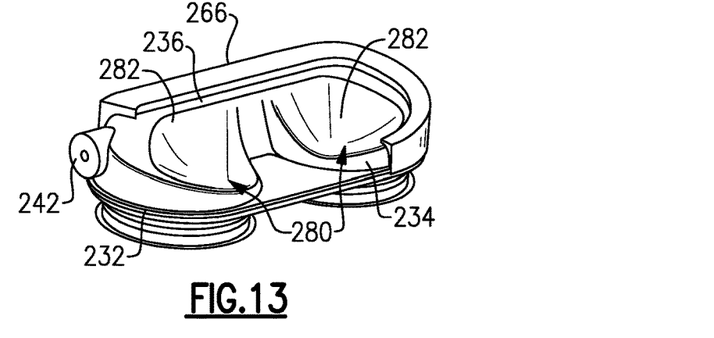
FIG. 13 shows a perspective view of the mixer of FIG. 12.

FIGS. 12 through 16C show another exemplary embodiment of a mixer 218. The mixer 218 has a mixer housing 230 that includes an inlet portion 232 and an outlet portion 234 that are connected to each other with a channel portion 236 as shown in FIG. 13. In one example, the channel portion 236 is offset relative to a center of the mixer housing 230 and extends generally along a peripheral edge of the housing 230. An inlet baffle 238 is positioned at the inlet portion 232 and an outlet baffle 240 is positioned at the outlet portion 234, with the inlet 238 and outlet 240 baffles being non-concentric. The inlet baffle 238 is concentric with the first axis A1 and the outlet baffle 240 is concentric with the second axis A2. An injector housing 242 is attached to the mixer housing 230 downstream of the inlet baffle 238. The doser 28 is externally mounted to the injector housing 242 and injects the reducing agent into a spray guide 244 that is mounted within the injector housing 242. The spray guide 244 has a spray inlet that receives spray from the doser 28 and has a spray outlet that directs spray into the channel portion 236.

In one example, the inlet 232 and outlet 234 portions are mirrored concave impression shapes 280 that are connected by the channel portion 236. In one example, the concave impressions 280 are located at the centers of the inlet 232 and outlet 234 portions such that raised wall portions 282 extend at least partially around a periphery of the inlet 232 and outlet 234 portions.

In one example, the channel portion 236 comprises a rectangular sectioned straight duct. The inlet portion 232 receives exhaust gas from an outlet of the DPF 20 through the inlet baffle 238. In one example shown in FIG. 14, the inlet baffle 238 comprises a flat perforated baffle plate. The inlet baffle 238 includes various types of openings, slots, apertures, etc. and is configured to direct certain percentages of exhaust gas to different areas of the mixer 218. In one example, the inlet baffle 238 includes at least one primary opening 246, at least one secondary opening 248 smaller than the primary opening 246, and a plurality of third openings 250 that are smaller than the secondary opening 248.

The inlet baffle 238 may also include at least one opening or slot 268 (FIG. 14) formed in the outer edge of the inlet baffle 238 that is used to direct exhaust gas into an outer jacket 266. The slot 268 is positioned near the perforated third openings 250 and directs exhaust gas flow to enter a secondary channel in the jacket 266 that is separate from the main channel of the housing 230. The flow is directed along an external surface of the channel portion 236 and enters back into the mixer housing 230 at the opposite end of the mixer. The exhaust gas in the jacket 266 heats the outer wall of the mixer housing 230 that is subject to spray impingement on the inside to prevent deposits from forming.

Figure 14:
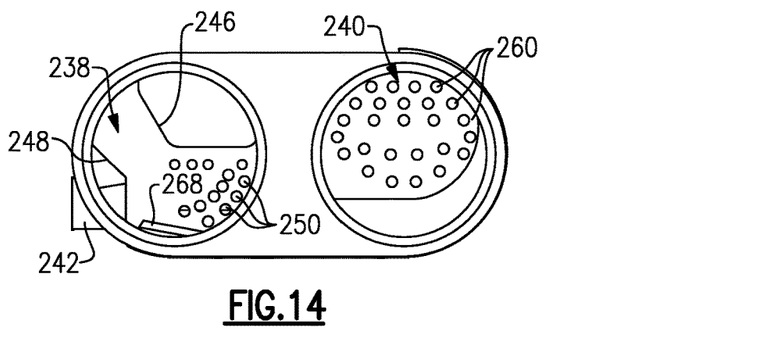
FIG. 14 is an end view showing one example of inlet and outlet baffles for the mixer of FIG. 13.

A majority of the exhaust gas flows through the primary opening 246 which is an open area adjacent to a lowest part of the mixer housing upstream concave impression 280. The secondary opening 248 directs flow into the injector housing 242 which diverts the exhaust gas into the spray guide 244 which shrouds the spray stream and pushes the spray into the channel portion 236 and into the outlet portion 234 of the mixer housing 230. The plurality of third openings 250 comprise a series of perforated slots or holes in the inlet baffle 238 which allow exhaust gas from the DPF 20 to enter the spray area and promote droplet breakup. The exhaust and spray mixture flows through the channel portion 236 until the mixture meets the downstream concave impression 280 in the mixer housing 230 where the mixture is forced to flow around the concave impression and exit through the outlet baffle 240 just before an inlet to a face of the SCR 24. In one example, there is a gap between the outlet baffle 240 and the SCR face of at least 25 mm that allows the mixture of gasses to evenly distribute over the SCR surface.

In one example, the location and size of the primary opening 246 is configured to control and direct 30-80% of the exhaust gas exiting the DPF 20 into a volume inside the mixer housing 230 that is upstream of the spray outlet. The plurality of third openings 250 in the inlet baffle 238 are located adjacent to the spray outlet to allow 10-20% of the exhaust gas exiting the DPF 20 to initiate breaking up the spray into ammonia gas. The secondary opening 248 comprises a slot that is used to feed 5-20% of the exhaust gas to the spray guide 244. The slot is located at a periphery of the inlet baffle 238 and is adjacent to a spray guide cavity defined within the injector housing 242. In one example, the slot 268 is located at the periphery of the inlet baffle 238 and receives between 5-20% of the exhaust flow and ducts the flow into the heated outer jacket 266.

In one example, the externally mounted jacket 266 has an L-shaped cross-section that envelopes one side and a top of the mixer housing 230 along the channel portion 236 of the mixer housing 230 and follows the same curvature and helix pitch as the raised wall portions 282 of the mixer housing 230. In one example, there is a 5-10 mm gap between the jacket 266 and the housing 230 to form a secondary flow channel within the jacket 266. A slot 270 in the mixer housing 230 at the inlet portion 232 receives exhaust gas from the slot 268 in the inlet baffle 238 and a slot 272 in the outlet portion 234 allows the flow to exit from the heated jacket 266 upstream of the outlet baffle 240. As discussed above, the jacket 266 is used to heat an external side of the mixer housing 230 with 5-10% of the exhaust gas. As an alternative to the heated jacket 266, an inner wall 174 (FIG. 11) as described above could be used to provide a heated surface inside the mixer housing 230.

As discussed above, the mixer housing 230 includes an upstream concave impression 280 formed in the inlet portion 232. In one example, the lowest part of the concave impression 280 forms a tight gap between this lowest part and an inlet baffle surface, so that exhaust gas cannot bypass from the main opening 246 directly to the outlet baffle 240. The concave impression 280 also helps guide the exhaust gas exiting the primary opening 246 in the inlet baffle 238 past the injection spray zone.

In one example, the spray guide 244 comprises a cone 252 (FIG. 15) that is mounted within the injector housing 242 and which extends from a cone inlet 254 to a cone outlet 256. The cone inlet 254 is defined by a first cross-section area that is less than a second cross-sectional area at the cone outlet 256. The injector housing 242 extends outside the mixer housing 230 and comprises a cylindrical shape such that the housing 242 surrounds the cone 252 concentrically. The injector housing 242 guides the exhaust gas from the secondary opening 248 in the inlet baffle 238 along an outer surface of the cone 252 up to an inside surface of the housing at the doser mount location. The flow then enters the cone inlet 254 which is at the smaller diameter and open end of the cone 252.

Figure 15:
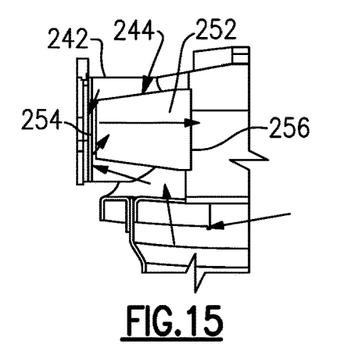
FIG. 15 is a side section view of one example injection assembly used with the mixer of FIG. 13.
Figure 16A:
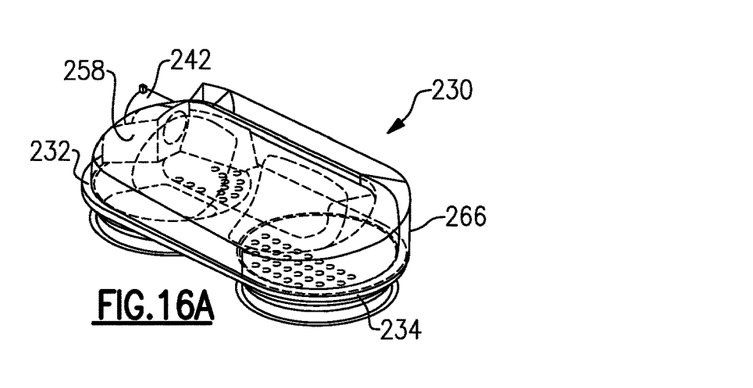
FIG. 16A is perspective view of the mixer and an outer jacket from the mixer of FIG. 13.
Figure 16B:
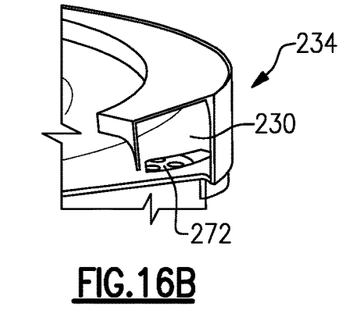
FIG. 16B shows a jacket outlet for the jacket of FIG. 16A.
Figure 16C:
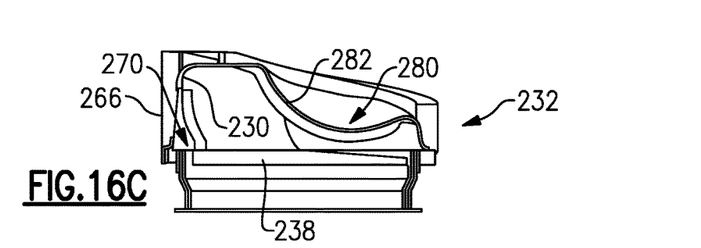
FIG. 16C shows a jacket inlet for the jacket of FIG. 16A.
Figure 17:
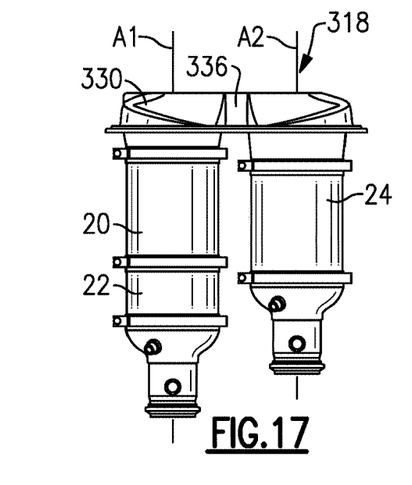
FIG. 17 shows another example of a vehicle exhaust system with a mixer.

A swirl cone deflector plate 258 is attached to the large diameter open end of the cone 252 near the cone outlet 256 to support the cone 252 in the mixer 218. The deflector plate 258 also divides a main mixer volume (receiving exhaust gas from the primary opening 246 and third openings 250) from a cone volume (receiving exhaust gas from the secondary opening 248) within the injector housing 242 to duct the 5-10% of exhaust flow into the cone inlet 254.

In one example, the channel portion 236 comprises a duct that is a straight section of the mixer housing 230 and is co-axial with the injection spray. In one example, the duct cross-section is rectangular and has a cross-sectional area that is the same as an inlet pipe to the aftertreatment exhaust system. In one example, the width of the duct is half the width of the mixer 218, and the height is determined based the packaging of the cone 252; however, the height is adjusted to be as minimal as possible for packaging purposes, while also providing the correct cross sectional area.

As discussed above, the outlet portion 234 of the mixer housing 230 comprises a downstream concave impression 280 that is a mirror of the upstream concave impression 280 of the inlet portion 232. The concave impression surface guides the exhaust gas from the channel portion 236 to distribute over the outlet baffle 240 and then exit through one or more openings 260 of the outlet baffle 240. The lowest part of the concave impression 280 is tightly spaced to the outlet baffle 240 to create a guiding wall for the exhaust gas and to prevent the exhaust gas from flowing directly through the openings 260 and bypassing the mixing effect in the downstream concave impression section.

In one example, the outlet baffle 240 comprises a flat plate and the plurality of openings 260 form a perforated hole pattern over approximately more than half of an entire area of the flat outlet baffle 240.

Figure 18:
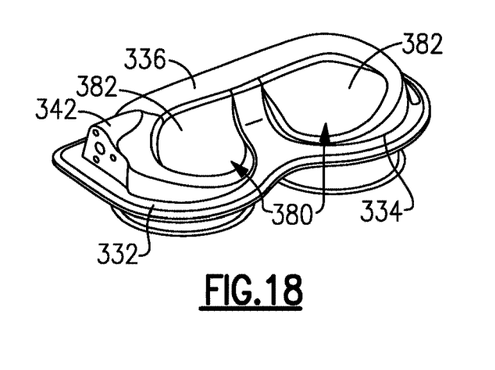
FIG. 18 shows a perspective view of the mixer of FIG. 17.

FIGS. 17 through 21C show another exemplary embodiment of a mixer 318. The mixer 318 has a mixer housing 330 that includes an inlet portion 332 and an outlet portion 334 that are connected to each other with a channel portion 336 as shown in FIG. 18. In one example, the channel portion 336 is offset relative to a center of the mixer housing 330 and extends generally along a peripheral edge of the housing 330. An inlet baffle 338 is positioned at the inlet portion 332 and an outlet baffle 340 is positioned at the outlet portion 334, with the inlet 338 and outlet 340 baffles being non-concentric. The inlet baffle 338 is concentric with the first axis A1 and the outlet baffle 340 is concentric with the second axis A2. An injector housing 342 is incorporated into the mixer housing 330 downstream of the inlet baffle 338. The doser 28 is externally mounted to the injector housing 342 and injects the reducing agent into a spray guide 344 that is mounted within the injector housing 342. The spray guide 344 has a spray inlet that receives spray from the doser 28 and has a spray outlet that directs spray into the channel portion 336.

In one example, the inlet 332 and outlet 334 portions are mirrored concave impression shapes 380 that are connected by the channel portion 336. In one example, the concave impressions 380 are located at the centers of the inlet 332 and outlet 334 portions such that raised wall portions 382 extend at least partially around a periphery of the inlet 332 and outlet 334 portions.

In one example, the channel portion 336 comprises a rectangular sectioned straight duct. The inlet portion 332 receives exhaust gas from an outlet of the DPF 20 through the inlet baffle 338. In one example shown in FIG. 19, the inlet baffle 338 comprises a flat perforated baffle plate. The inlet baffle 338 includes various types of openings, slots, apertures, etc. and is configured to direct certain percentages of exhaust gas to different areas of the mixer 318. In one example, the inlet baffle 338 includes at least one primary opening 346, at least one secondary opening 348 smaller than the primary opening 346, and a plurality of third openings 350 that are smaller than the secondary opening 348.

Figure 21A:
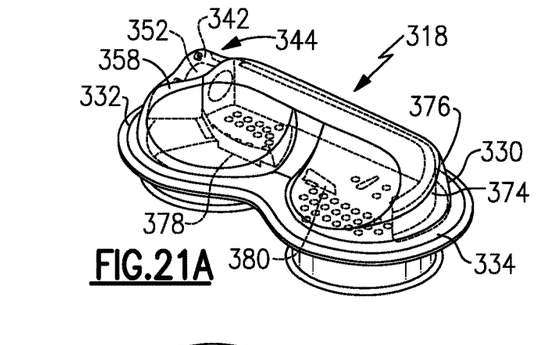
FIG. 21A is perspective view of the mixer and an inner wall from the mixer of FIG. 18.
Figure 21B:
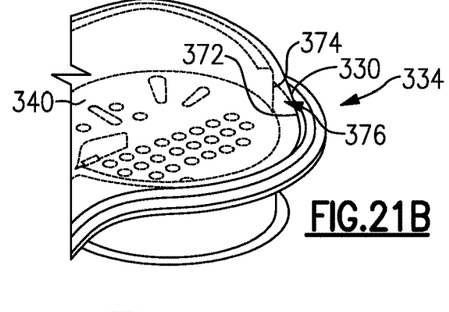
FIG. 21B shows an inner wall outlet for the jacket of FIG. 21A.
Figure 21C:
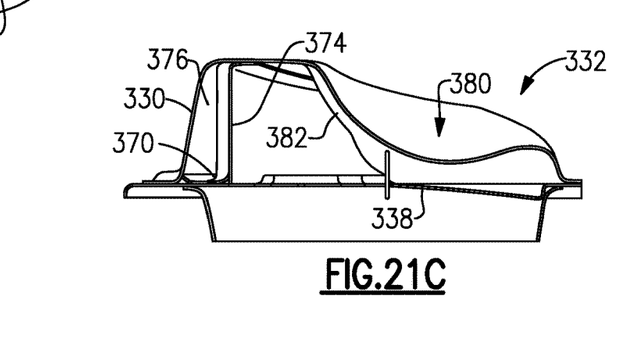
FIG. 21C shows an inner wall inlet for the jacket of FIG. 21A.

In one example, the mixer 318 includes an inner wall 374 that is located in the mixing cavity and spaced inwardly from an inner surface of the outer housing 330 by a gap 376 (FIGS. 21A-C). In one example, the inlet baffle 338 includes at least one opening or slot 368 (FIG. 19) formed in the outer edge of the inlet baffle 338 that is used to direct exhaust gas into the gap 376 formed between the inner surface of the housing 330 and the inner wall 374. The slot 368 is positioned near the perforated third openings 350 and directs exhaust gas flow to enter a secondary channel formed in the gap 376 that is separate from the main internal cavity of the housing 330. The flow is directed along an outward-facing surface of the inner wall 374 and enters back into the main cavity of the mixer housing 330 at the opposite end of the mixer. The exhaust gas in the gap 376 heats the inner wall 374 to prevent deposits from forming on an inwardly-facing surface of the inner wall 374 which is subject to spray impingement.

Figure 19:
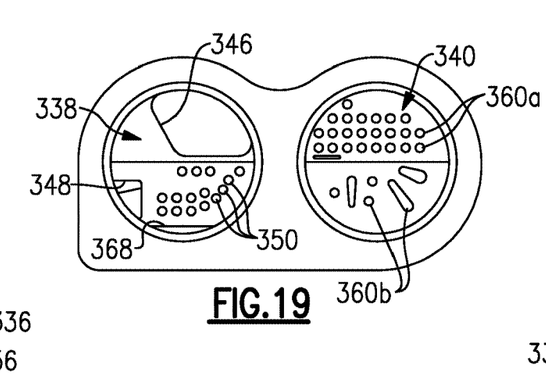
FIG. 19 is an end view showing one example of inlet and outlet baffles for the mixer of FIG. 18.

A majority of the exhaust gas flows through the primary opening 346 which is an open area adjacent to a lowest part of the mixer housing upstream concave impression 380. The secondary opening 348 directs flow into the injector housing 342 which diverts the exhaust gas into the spray guide 344 which shrouds the spray stream and pushes the spray into the channel portion 336 and into the outlet portion 334 of the mixer housing 330. The plurality of third openings 350 comprise a series of perforated slots or holes in the inlet baffle 338 which allow exhaust gas from the DPF 20 to enter the spray area and promote droplet breakup. The exhaust and spray mixture flows through the channel portion 336 until the mixture meets the downstream concave impression 380 in the mixer housing 330 where the mixture is forced to flow around the concave impression and exit through the outlet baffle 340 just before an inlet to a face of the SCR 24. In one example, there is a gap between the outlet baffle 340 and the SCR face of at least 25 mm that allows the mixture of gasses to evenly distribute over the SCR surface.

In one example, the location and size of the primary opening 346 is configured to control and direct 30-80% of the exhaust gas exiting the DPF 20 into a volume inside the mixer housing 330 that is upstream of the spray outlet. The plurality of third openings 350 in the inlet baffle 338 are located adjacent to the spray outlet to allow 10-20% of the exhaust gas exiting the DPF 20 to initiate breaking up the spray into ammonia gas. The secondary opening 348 comprises a slot that is used to feed 5-10% of the exhaust gas to the spray guide 344. The slot is located at a periphery of the inlet baffle 338 and is adjacent to a spray guide cavity defined within the injector housing 342. In one example, the additional slot 368 is located at the periphery of the inlet baffle 338 and receives between 5-10% of the exhaust flow and ducts the flow into the gap 376.

In one example, the inner wall 374 extends from an outlet of the spray guide 344, along the channel portion 336 of the mixer housing 330, and then follows the same curvature and helix pitch as the raised wall portions 382 of the mixer housing 330 at the inlet and/or outlet portions 332, 334. In one example, the gap 376 between the inner wall 374 and the housing 330 is between 5-10 mm to provide a secondary flow channel within the mixer 318. A wall inlet 370 receives exhaust gas from the slot 368 in the inlet baffle 338 and directs the exhaust gas into the gap 376. A wall outlet 372 in the outlet portion 234 allows the flow to exit from the gap 376 upstream of the outlet baffle 340. As discussed above, the inner wall 374 provides a secondary exhaust gas flow path that receives 5-10% of the exhaust gas to heat the inner wall 374. Further, it should be understood that the inner wall 374 could also be used instead of, or in addition to, the outer jacket configuration disclosed in any of the examples described above.

As discussed above, the mixer housing 330 includes an upstream concave impression 380 formed in the inlet portion 332. In one example, the lowest part of the concave impression 380 forms a tight gap between this lowest part and an inlet baffle surface, so that exhaust gas cannot bypass from the main opening 346 directly to the outlet baffle 340. The concave impression 380 also helps guide the exhaust gas exiting the primary opening 346 in the inlet baffle 338 past the injection spray zone.

In one example, the spray guide 344 comprises a cone 352 (FIG. 20) that is mounted within the injector housing 342 and which extends from a cone inlet 354 to a cone outlet 356. The cone inlet 354 is defined by a first cross-section area that is less than a second cross-sectional area at the cone outlet 356. The injector housing 342 is incorporated directly into the mixer housing 330 to provide a compact configuration and at least partially surrounds the cone 352 to facilitate directing exhaust flow into the cone inlet 354. The injector housing 342 guides the exhaust gas from the secondary opening 348 in the inlet baffle 338 along an outer surface of the cone 352 up to an inside surface of the housing at the doser mount location. The flow then enters the cone inlet 354 which is at the smaller diameter and open end of the cone 352.

Figure 20:
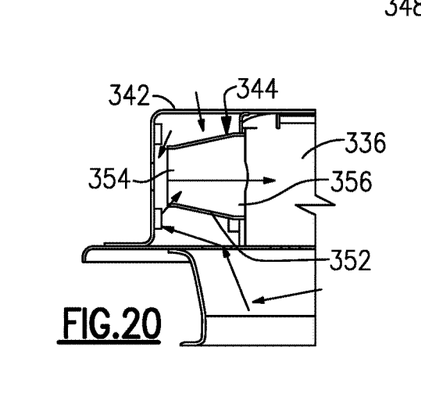
FIG. 20 is a side section view of one example injection assembly used with the mixer of FIG. 18.

A swirl cone deflector plate 358 is attached to the large diameter open end of the cone 352 near the cone outlet 356 to support the cone 352 in the mixer 318. The deflector plate 358 also divides a main mixer volume (receiving exhaust gas from the primary opening 346 and third openings 250) from a cone volume (receiving exhaust gas from the secondary opening 348) within the injector housing 342 to duct the 5-10% of exhaust flow into the cone inlet 354. The mixer 318 also includes one or more inlet deflectors 378 and one or more outlet deflectors 380 which are used to improve droplet break-up and reduce deposits. The inlet deflector 378 is positioned upstream of the spray and restricts exhaust gas flow to the lower portion of the main duct. The gas flow has an increased velocity due to the smaller open area caused by the inlet deflector 378, which promotes droplet break-up to gas.

In one example, the channel portion 336 comprises a duct that is a straight section of the mixer housing 330 and is co-axial with the injection spray. In one example, the duct cross-section is rectangular and has a cross-sectional area that is the same as an inlet pipe to the after treatment exhaust system. In one example, the width of the duct is half the width of the mixer 318, and the height is determined based the packaging of the cone 352; however, the height is adjusted to be as minimal as possible for packaging purposes, while also providing the correct cross sectional area.

As discussed above, the outlet portion 334 of the mixer housing 330 comprises a downstream concave impression 380 that is a mirror of the upstream concave impression 380 of the inlet portion 332. The concave impression surface guides the exhaust gas from the channel portion 336 to distribute over the outlet baffle 340 and then exit through one or more openings 360a, 360b of the outlet baffle 340. The lowest part of the concave impression 380 is tightly spaced to the outlet baffle 340 to create a guiding wall for the exhaust gas and to prevent the exhaust gas from flowing directly through the openings 360a, 360b and bypassing the mixing effect in the downstream concave impression section. In one example, the outlet baffle 340 comprises a flat plate and the openings 360a comprise a first plurality of openings 360 that form a perforated hole pattern over approximately half of an entire area of the flat outlet baffle 340. The openings 360b comprise slots or holes that are located in an opposite half of the outlet baffle 340.

In each of the examples, the mixer comprises a single-piece upper or outer housing that includes both inlet and outlet portions which are connected to each other via a straight channel. The inlet portion is coupled to an upstream exhaust component and the outlet portion is coupled to a downstream exhaust component that is non-concentric with the upstream exhaust component. The inlet and outlet portions are configured such that they are mirrored images of each other. The channel is offset from a center of the inlet and outlet portions and extends along one edge of the outer housing to connect the mirrored inlet and outlet portions to each other. The mixers include a spray injector that is coaxial with the channel portion. Each mixer includes an outer jacket and/or an inner wall that extends along the channel portion and forms a secondary flow path that heats areas within the mixer that are subject to spray impingement such that deposit formation is reduced. The mixers also include inlet baffles that are configured to divide incoming exhaust gas into sub-portions that are directed into different areas of the mixer. This configuration provides a very compact arrangement while still providing sufficient mixing capability and reduced deposit formation.

As discussed above, the subject invention provides a compact system by integrating the mixing of the reducing agent and exhaust gas into a U-shaped mixer housing that is used to connect the DOC/DPF to the SCR/SCRF catalyst. The exemplary mixer housings are configured with an offset channel that connects to mirror image shape inlet/outlet portions to create tangential flow that promotes efficient mixing upstream of the SCR/SCRF through optimized inlet and outlet baffles.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The invention claimed is:

1. A mixer assembly for a vehicle exhaust system comprising:
a housing having an inlet portion and an outlet portion that are connected to each other with a channel portion;
an inlet baffle positioned at the inlet portion;
an outlet baffle positioned at the outlet portion, wherein the inlet and outlet baffles are non-concentric;
an injector housing attached to the housing downstream of the inlet baffle;
a spray guide mounted within the injector housing, wherein the spray guide has a spray inlet and a spray outlet that directs spray into the channel portion; and
at least one of an outer jacket or inner wall to define a secondary flow path within the mixer assembly.

2. The mixer assembly according to claim 1 wherein the inlet and outlet portions are mirror images of each other.

3. The mixer assembly according to claim 2 wherein the inlet and outlet portions have helix shapes such that the housing includes an upstream helix comprising a helix shaped upper surface of the inlet portion, and wherein the outlet portion of the housing comprises a downstream helix that is a mirror of the upstream helix of the inlet portion.

4. The mixer assembly according to claim 2 wherein the inlet and outlet portions have concave impressions.

5. The mixer assembly according to claim 1 wherein the channel portion comprises a straight duct section.

6. The mixer assembly according to claim 5 wherein the straight duct section has a rectangular cross-section.

7. The mixer assembly according to claim 5 wherein the outer jacket surrounds at least a portion of the straight duct section.

8. The mixer assembly according to claim 1 wherein the inlet baffle includes at least one primary opening, at least one secondary opening smaller than the primary opening, and a plurality of third openings that are smaller than the secondary opening.

9. The mixer assembly according to claim 8 wherein the spray guide comprises a cone, and wherein the spray inlet is defined by a cross-section that is smaller than a cross-section at the spray outlet.

10. The mixer assembly according to claim 9 wherein the inlet portion receives exhaust gas from an upstream exhaust component, and wherein 30-80% of the exhaust gas is directed through the primary opening to a volume that is upstream of the spray outlet.

11. The mixer assembly according to claim 9 wherein the inlet portion receives exhaust gas from an upstream exhaust component, and wherein 5-10% of the exhaust gas is directed through the secondary opening to supply exhaust gas to the spray inlet to mix with injected spray prior to exiting the spray outlet.

12. The mixer assembly according to claim 9 wherein the inlet portion receives exhaust gas from an upstream exhaust component, and wherein 10-20% of the exhaust gas is directed through the plurality of third openings to break up spray exiting the spray outlet.

13. The mixer assembly according to claim 8 wherein the inlet portion receives exhaust gas from an upstream exhaust component, and wherein the inlet baffle includes at least one slot formed in a periphery of the inlet baffle through which 5-10% of the exhaust gas is directed into the outer jacket that at least partially surrounds the channel portion.

14. The mixer assembly according to claim 1 wherein exhaust gas received through the inlet baffle is directed toward the outlet baffle, and wherein the outlet baffle includes at least one primary opening and a plurality of slots that extend in a radial direction relative to a center of the outlet baffle, and wherein 60-80% of the exhaust gas exits the housing via the primary opening.

15. The mixer assembly according to claim 14 wherein the plurality of slots comprises two to four slots which are circumferentially spaced apart from each other.

16. The mixer assembly according to claim 1 wherein the inner wall is spaced apart from an inner surface of the housing by a gap, the inner wall extending from the inlet portion, along the channel portion, and to the outlet portion to define a secondary flow path within the housing.

17. The mixer assembly according to claim 1 wherein the inlet portion, outlet portion, and channel portion comprise a single-piece housing.

18. The mixer assembly according to claim 1 wherein:
the outer jacket is spaced outwardly from an outer surface of the mixer housing by a gap to provide the secondary flow path; or
the inner wall is spaced inwardly from an inner surface of the mixer housing by a gap to provide a secondary flow path.

19. The mixer assembly according to claim 18 wherein the inlet baffle comprises a flat baffle plate that includes at least one primary opening, at least one secondary opening smaller than the primary opening, and at least one third opening that is formed at a peripheral edge of the flat baffle plate, and wherein a majority of the exhaust gas flows through the at least one primary opening, the at least one secondary opening directs flow into the injector housing, and the at least one third opening directs flow into the secondary flow path.

20. A vehicle exhaust system assembly comprising:
a first exhaust component assembly extending along a first axis;
a second exhaust component assembly extending along a second axis that is spaced apart from and parallel to the first axis;
a mixer that connects a component outlet from the first exhaust component assembly to a component inlet of the second exhaust component assembly, wherein the mixer includes a mixer housing having an inlet portion and an outlet portion that are connected to each other with a channel portion, an inlet baffle positioned at the inlet portion, and an outlet baffle positioned at the outlet portion, and wherein the inlet baffle is concentric with the first axis and the outlet baffle is concentric with the second axis;
wherein the mixer includes
an outer jacket that is spaced outwardly from an outer surface of the mixer housing by a gap to provide a secondary flow path, or
an inner wall that is spaced inwardly from an inner surface of the mixer housing by a gap to provide a secondary flow path; and
an injector assembly including an injector housing attached to the mixer housing downstream of the inlet baffle and a cone mounted within the injector housing, wherein the cone has a cone inlet that receives spray from an injector and has a cone outlet that directs spray into the channel portion.

21. The exhaust system assembly according to claim 20 wherein the channel portion comprises a straight duct section, and wherein the inlet and outlet portions are mirror images of each other.

22. The exhaust system assembly according to claim 20 wherein the inlet baffle includes at least one primary opening, at least one secondary opening smaller than the primary opening, and a plurality of third openings that are smaller than the secondary opening, and wherein
30-80% of exhaust gas exiting the first exhaust component assembly is directed through the primary opening to a volume that is upstream of the spray outlet,
5-10% of the exhaust gas is directed through the secondary opening to supply exhaust gas to the cone inlet, and
10-20% of the exhaust gas is directed through the plurality of third openings to break up spray exiting the cone outlet.

23. The exhaust system assembly according to claim 22 wherein the mixer housing includes the outer jacket, and wherein the outer jacket surrounds at least a portion of the channel portion to provide the secondary flow path external to the mixer housing, and wherein the inlet baffle includes at least one slot formed in a periphery of the inlet baffle through which 5-10% of the exhaust gas is directed into secondary flow path formed by the outer jacket.

24. The exhaust system assembly according to claim 20 wherein the outlet baffle includes at least one primary opening and a plurality of radially extending slots, and wherein 60-80% of the exhaust gas exits the mixer housing via the primary opening.

25. The exhaust system assembly according to claim 20 wherein the inlet portion, outlet portion, and channel portion comprise a single-piece mixer housing, and wherein the channel portion comprises a duct that is a straight section of the mixer housing and is co-axial with injected spray.

26. The exhaust system assembly according to claim 20 wherein the mixer includes the inner wall, and wherein the inner wall extends from the inlet portion, along the channel portion, and to the outlet portion to define the secondary flow path internally within the mixer housing.

27. The exhaust system assembly according to claim 20 wherein the mixer housing includes an upstream helix comprising a helix shaped upper surface of the inlet portion, and wherein the outlet portion of the mixer housing comprises a downstream helix that is a mirror of the upstream helix of the inlet portion, and wherein the inlet baffle includes at least one primary opening and at least one secondary opening smaller than the primary opening, and wherein a majority of the exhaust gas flows through the at least one primary opening which is an open area adjacent to a lowest part of the upstream helix and the at least one secondary opening directs flow into the injector housing.

28. The exhaust system assembly according to claim 20 wherein the inlet baffle comprises a flat baffle plate that includes at least one primary opening, at least one secondary opening smaller than the primary opening, and at least one third opening that is formed at a peripheral edge of the flat baffle plate, and wherein a majority of the exhaust gas flows through the at least one primary opening, the at least one secondary opening directs flow into the injector housing, and the at least one third opening directs flow into the secondary flow path.

* * * * *

UNITED STATES PATENT AND TRADEMARK OFFICE
CERTIFICATE OF CORRECTION

| | |
|---|---|
| PATENT NO. | : 11,242,790 B2 |
| APPLICATION NO. | : 16/756280 |
| DATED | : February 8, 2022 |
| INVENTOR(S) | : Chris Chapman et al. |

It is certified that error appears in the above-identified patent and that said Letters Patent is hereby corrected as shown below:

In the Claims

In Claim 18, Column 15, Line 27; replace "the mixer housing" with --the housing--

In Claim 18, Column 15, Line 30; replace "the mixer housing" with --the housing--

In Claim 19, Column 15, Line 37; replace "the exhaust gas" with --exhaust gas--

In Claim 22, Column 16, Line 15; replace "the spray outlet" with --the cone outlet--

In Claim 24, Column 16, Line 32; replace "the exhaust gas" with --exhaust gas--

In Claim 27, Column 16, Line 52; replace "the exhaust gas" with --exhaust gas--

In Claim 28, Column 16, Line 61; replace "the exhaust gas" with --exhaust gas--

Signed and Sealed this
Twenty-fourth Day of May, 2022

Katherine Kelly Vidal
*Director of the United States Patent and Trademark Office*